United States Patent [19]

Keane

[11] 3,790,966
[45] Feb. 12, 1974

[54] QUICK-CHANGE FAUCET
[76] Inventor: Joseph Keane, 6634 Villa Vista Dr., Riverside, Calif. 92509
[22] Filed: Dec. 16, 1971
[21] Appl. No.: 208,749

[52] U.S. Cl. .................................................. 4/192
[51] Int. Cl. ........................ E03c 1/04, E03c 1/042
[58] Field of Search ................................ 4/191, 192

[56] References Cited
UNITED STATES PATENTS

| | | | |
|---|---|---|---|
| 3,427,049 | 2/1969 | Politz | 4/192 X |
| 2,637,044 | 5/1953 | Low | 4/192 |
| 2,538,835 | 1/1951 | Harvey et al. | 4/192 X |
| 3,410,302 | 11/1968 | Frick | 4/192 X |
| 2,392,918 | 1/1946 | Haberstump | 4/192 X |
| 2,460,005 | 1/1949 | Gruen | 4/191 |
| 2,846,691 | 8/1958 | Zetting | 4/191 X |
| 3,106,722 | 10/1963 | Logan et al. | 4/191 X |
| 3,374,957 | 3/1968 | Tyler | 4/192 X |
| 3,443,266 | 5/1969 | Mongerson et al. | 4/191 |
| 3,633,223 | 1/1972 | Killias | 4/192 |

FOREIGN PATENTS OR APPLICATIONS
787,020 9/1935 France .................................. 4/192

Primary Examiner—Harvey C. Hornsby
Assistant Examiner—Donald B. Massenberg

[57] ABSTRACT

A quick-change faucet that can be attached to a sink, working entirely from above, except for attaching the riser pipes to the shut-off valves. The riser pipes are first attached to the hot and cold water valves before mounting the faucet on the sink, and the riser pipes are passed down through holes in the sink ledge which are big enough in diameter to pass the fittings. The bottom ends of the riser pipes are then connected to the shut-off valves. The water-mixing manifold, or cast faucet housing, has provision for passing mounting bolts downwardly through bolt-holes, and these bolts are screwed down into threaded bushings which are secured in openings in the sink ledge. The mounting bolts are turned down into the bushings from above the sink, instead of reaching up under the sink into the almost inaccessible area behind the basin.

10 Claims, 11 Drawing Figures

Patented Feb. 12, 1974
3,790,966
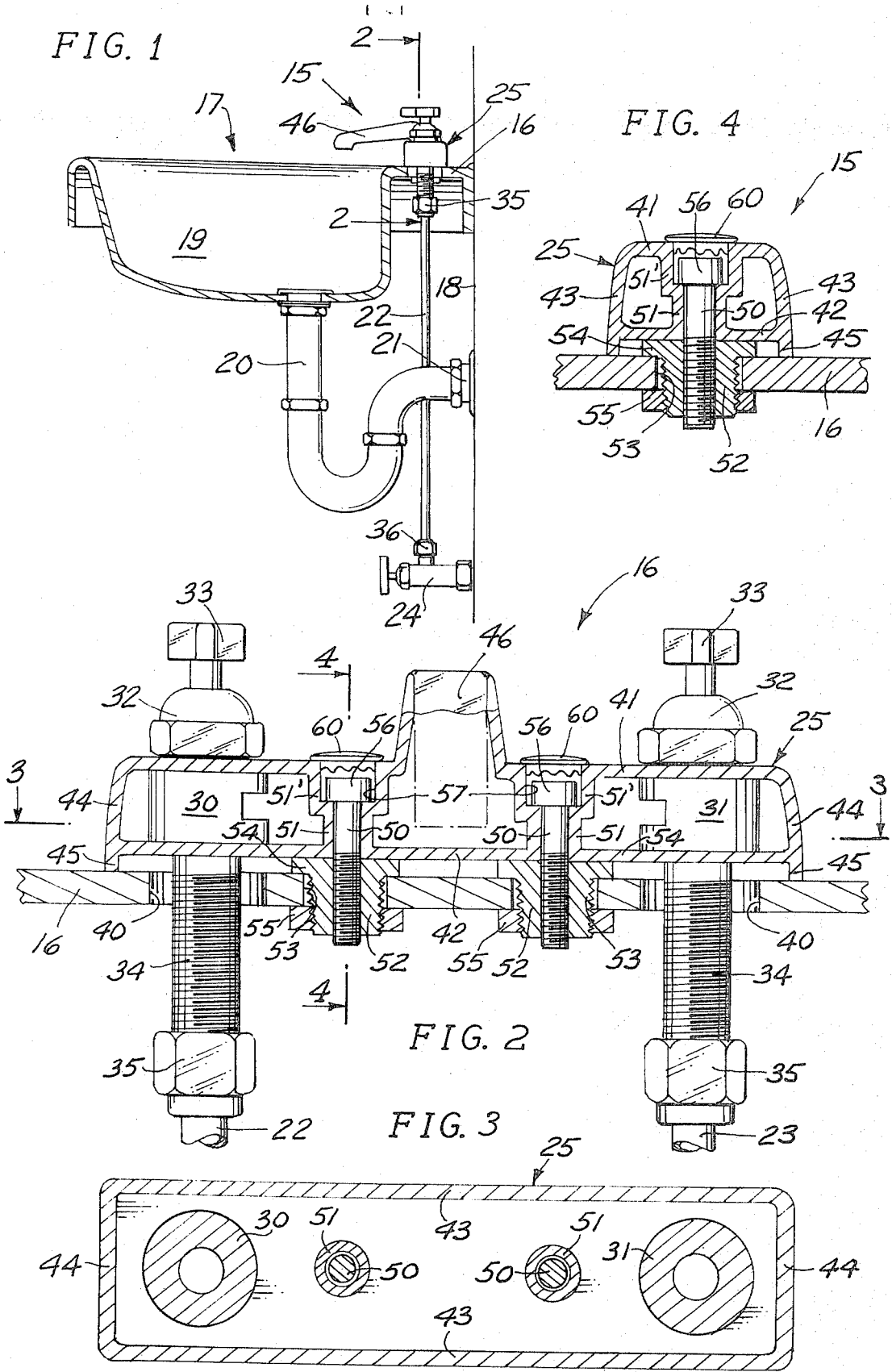

QUICK-CHANGE FAUCET

BACKGROUND OF THE INVENTION

The present invention pertains to water faucets of the type wherein the water-mixing manifold is mounted on top of the sink ledge, and the invention is particularly concerned with a new and unique quick-change faucet that can be mounted on the sink by working entirely from above the sink, except for the minor (and very easy) task of connecting the hot and cold riser pipes to their respective shut-off valves on the wall.

Heretofore, it has always been a very difficult and laborious job to mount a water faucet on a sink, because of the necessity of getting up into the relatively inaccessible space behind the basin with the necessary tools to start and tighten the bolts, or nuts, which secure the facucet housing to the sink ledge. Usually, the attachment is accomplished by means of two clamping nuts on the threaded nipples of both the hot and cold water valves, and these nuts must be inserted on the nipples after the faucet has been placed on the sink. The basin is close to the wall, and it is necessary to reach up into the confined space between the basin and the wall to try to start the nut on each of the nipples. Since the wash basin is in the way, and such lavatories are frequently installed in builtin cabinet counters, which make it difficult to get under the sink, the workman often cannot see the nipple that he is trying to screw the nut onto, and must work entirely by feel. Once the nut has been screwed on finger-tight, it is necessary to reach up into the almost inaccessible space with a fairly large wrench to tighten it. Because of the lack of space to turn the wrench, and the fact that the nut and wrench are both where they cannot be seen, it is an awkward, laborious, and time-consuming task to tighten the two nuts. With labor cost as high as it is, the cost of installing a faucet is relatively high, and this expense is compounded when it is necessary to remove an old faucet and replace it with a new one.

SUMMARY OF THE INVENTION

The primary object of the present invention is to provide a quick-change faucet that can be installed in a lavatory or sink working entirely from above, except for attaching the hot and cold water riser pipes to their respective shut-off valves. The advantage of this feature is that the workman does not have to work in the inaccessible space behind the wash basin, where there is not enough room to work handily, and where the tools and fastening members usually cannot be seen. The present invention provides mounting bolts, or screws, that can be reached with a tool from above, where there is ample room to work, and where the work can be seen by the workman.

Another object of the invention is to provide a quick-change faucet in which the hot and cold riser pipes are attached to their respective valves on the faucet before the latter is installed in the sink, and the riser pipes with attached fittings are then inserted down through holes in the sink ledge which are large enough to pass them freely.

A further object of the invention is to provide a faucet that can be quickly and easily removed or installed on a sink or lavatory by anyone having little knowledge or experience in plumbing repairs, thereby making it possible for the do-it-yourself homeowner to replace a faucet without calling in a professional plumber.

The foregoing and other objects and advantages of the invention will become apparent to those skilled in the art from the following detailed description of several illustrative embodiments thereof, with reference to the accompanying drawings.

BRIEF DESCRIPTION OF THE DRAWINGS

FIG. 1 is a vertical section through a lavatory wash basin, showing a quick-change faucet embodying the principles of my invention;

FIG. 2 is an enlarged cross-sectional view, taken at 2—2 in FIG. 1;

FIG. 3 is a horizontal section, taken at 3—3 in FIG. 2;

FIG. 4 is a sectional view, at 4—4 in FIG. 2;

FIG. 5 is a top plan view of the water-mixing manifold of another embodiment of the invention;

FIG. 6 is a sectional view, taken at 6—6 in FIG. 5;

FIG. 7 is a partially cut-away front elevation of another embodiment of the invention;

FIG. 8 is a perspective view of another embodiment of the invention;

FIG. 9 is an enlarged fragmentary view of one end of the faucet illustrated in FIG. 8, with a portion cut away to show a detail;

FIG. 10 is a slighly modified version of the embodiment of FIG. 7; and

Figure 11:
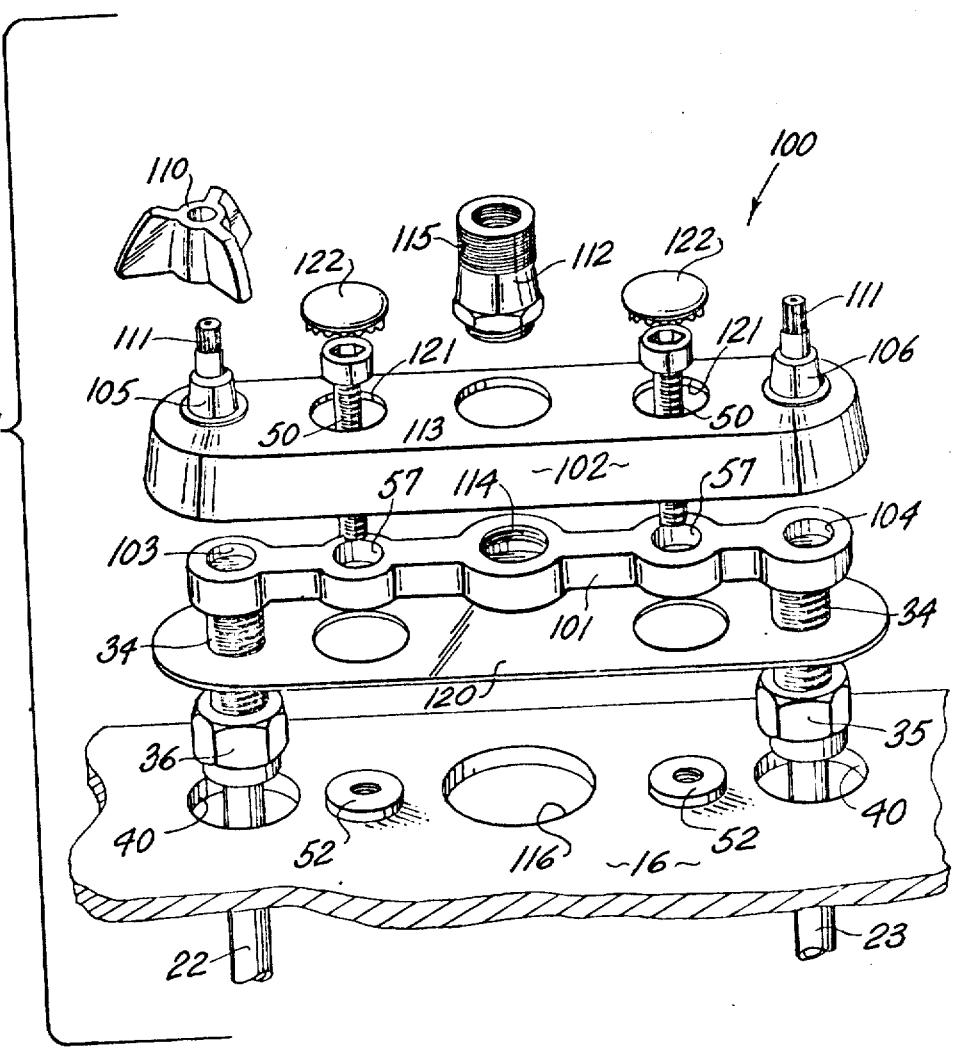
FIG. 11 is an exploded view of still another embodiment of the invention.

DESCRIPTION OF THE ILLUSTRATED EMBODIMENTS:

FIGS. 1 to 4 of the drawings illustrate a first embodiment of the invention, which is designated in its entirety by the reference numeral 15. The quick-change faucet 15 is mounted on the horizontal lavatory or sink ledge 16 at the rear of a lavatory 17, said lavatory or sink being mounted on a wall 18, and having a wash basin 19, with a drain 20 that is connected to the sewer outlet 21 in the usual way. The hot and cold water valves of the faucet are connected by riser pipes 22 and 23 to their respective shut-off valves 24 on the wall, only one of which appears in the drawings.

The faucet 15 comprises an elongated, hollow cast brass housing 25, which forms the water mixing manifold, in which hot and cold water are mixed to obtain the desired temperature. At one end of the housing 25 is the hot water valve 30, and at the other end the cold water valve 31. Screwed down onto each of the valves 30, 31 from above the housing 25 is a bonnet 32, with a handle 33 projecting upwardly from the top thereof.

Projecting downwardly from each of the valves 30, 31 is a threaded nipple 34, and screwed onto the bottom end of each nipple is a connector fitting 35, which joins the respective riser pipe 22, 23 to the nipple. At the bottom end of each riser pipe 22, 23 is another connector fitting 36, which joins the riser to its respective shut-off valve 24. Each of the nipples 34 projects downwardly through an opening 40 in the sink ledge 16, which is large enough in diameter to pass the connector fittings 35, so that the riser pipes and connector fittings can be assembled to the faucet 15 before mounting the same on the sink ledge 16. Thus, the faucet is placed on the sink ledge by passing the riser pipes 22, 23 and connector fittings 35 and 36 down through the openings 40.

The housing 25 of faucet 15 is a casting, and has vertically spaced top and bottom walls 41 and 42, side walls 43, and end walls 44. Projecting downwardly from the housing 25 around the entire edge thereof is a skirt 45, which raises the bottom wall 42 a short distance up from the top surface of the sink ledge 16 to provide clearance for the heads of the mounting bushings, as will be described presently. Rising from the top wall 41 of the housing 45 midway between the ends thereof is the discharge spout 46, which may be fixed or swingable.

The faucet housing 25 is attached to the sink ledge 16 by means of two mounting bolts 50, which pass downwardly through tubular barrels 51 in the housing, and screw into internally threaded bushings 52 in the sink ledge. Bushings 52 extend downwardly through holes 53 in the sink ledge 16, and have radially projecting flanges 54 at their upper ends, which overlie the top surface of the ledge around the margin of the holes. Each of the bushings 52 is threaded on its outer surface, and screwed onto the bottom end thereof is a nut 55. When nut 55 is tightened up on bushing 52, it clamps the latter tightly to the sink ledge 16. Thus, when bolts 5o are drawn up tight, the housing 25 is firmly and solidly connected to the sink.

Bolts 50 have cylindrical heads 56 which have sockets formed in their top ends to receive a wrench, such as an Allen wrench, for example. The bolt heads 56 are received within a counter-bore 57 in an enlarged-diameter upper portion 51' of the barrel 51, and the heads seat on the annular shoulder formed at the bottom of the counter-bore. An ornamental snap-on button 60 is pressed into the top end of the counter-bore 57 to close the same.

The operation of the invention is as follows: The faucet 15 is placed on the sink ledge 16 by passing the riser pipes 22, 23 and connector fittings 35, 36 down through holes 40 in the ledge. Mounting bolts 50 are then screwed down into the bushings 52, using a suitable wrench inserted into the socket in bolt head 56. When the bolts 50 have been tightened down, the buttons 60 are snapped into the counterbores 57. The final assembly step is to connect the risers 22, 23 to their respective shut-off valves, which is done with the connector fittings 36. Since the shut-off valves 24 are down in the open, where they are easily accessible, there is no problem connecting the riser pipes to them.

Another embodiment of the invention is illustrated in FIGS. 5 and 6. FIG. 5 is a top plan view of a water manifold 62, which is normally covered over and enclosed by a chrome-plated shell. Manifold 62 is also a brass casting, and is generally tubular in shape, as seen in FIG. 6, with enlargements 63 and 64 to receive the hot and cold water valves, respectively. A central enlargement 65 has a screw-threaded bore 66 in its top surface, into which a swing-spout (not shown) is screwed. Cast integrally with the manifold 62 are horizontally projecting ears 70, having holes formed therein through which mounting bolts 50 pass. Bolts 50 screw into threaded bushings 72, which may be made of metal, plastic, or any other suitable material. Bushings 72 are inserted into holes 73 in the sink ledge 16, and may be cemented in place, using epoxy cement or any other water-proof glue. A radial flange 74 on the bottom end of the bushing seats against the underside of the ledge 16 around the margin of the hole 73. Bolt 50, in this case, is shown as a conventional bolt with a hex head, although a socket-type head could be used if desired.

FIG. 7 shows another form of the invention. In this instance, the faucet is designated by the reference numeral 76, and comprises a base plate 80, having an upstanding cylindrical turret 81 at its midpoint, which contains a hot and cold water mixing valve actuated by a single control lever 82. Discharge spout 83 projects from the front side of the turret. The hot and cold water riser pipes 22 and 23 project downwardly from the bottom of the valve, and pass through an opening 84 in sink ledge 16. Base plate 80 lies flat on the top surface of sink ledge 16, and is secured to the ledge by two mounting bolts 50, which are screwed into bushings 72 mounted into holes 73 in the ledge. Bushings 72 are the same as in FIG. 6, and are cemented or pressed into place. The heads of bolts 50 are exposed, and therefore would be chrome-plated for the sake of appearances.

FIGS. 8 and 9 show another embodiment of the invention, in which a cast manifold housing 86 has laterally projecting ears 87 at each end, which lie flat against the sink ledge and are secured thereto by mounting bolts 50. Bolts 50 pass downwardly through holes 90 in the ears 87, and screw into threaded brass ferrules 91 that are molded into the lower ends of cylindrical rubber bushings 92. The upper end of the bushing 92 has a central hole large enough in diameter to pass the bolt 50 freely without binding. When the bolt 50 is drawn up tight, ferrule 91 is pulled upwardly, causing the bushing 92 to bulge outwardly in its hole 93 in the sink ledge. As hole 93 is a reasonably close fit for the relaxed bushing 92, the said bushing becomes tightly wedged in the hole when expanded, and thus provides a solid connection between the bolt 50 and sink ledge 16.

FIG. 10 is essentially the same as FIG. 7, and shows a faucet 95 having a flat base plate 80, which is fastened to the sink ledge by mounting bolts 50. However, the base plate and mounting bolts are covered by an ornamental housing 96 of sheet metal, which may be chrome plated for appearances. Housing 96 has circular openings 97 formed therein directly above each of the mounting bolts 50, to allow getting at the bolt heads with a wrench, and buttons 98 are snapped into the openings 97 to close the same. In this embodiment of the invention, the mounting bolts 50 are shown screwed into expandable rubber bushings 92 of the same type as shown in FIG. 9.

FIG. 11 is an exploded view of still another embodiment of the invention. The faucet is designated generally by the reference numeral 100, and comprises a water-mixing manifold 101, which is enclosed within and covered by an ornamental shell 102. The hot and cold water valves are screwed down into threaded openings 103 and 104, respectively, at opposite ends of the manifold. The valves, themselves, are shown at 105 and 106, projecting upwardly through holes in the top of shell 102. Handles 110 fit down on the serrated top ends 111 of the valve stems. A discharge spout connector fitting 112 passes downwardly through a central hole 113 in shell 102, and screws into threaded bore 114 in the top of manifold 101 at the midpoint thereof. The spout (not shown) screws on to the threaded end 115 of fitting 112, and may be either a swing-spout or fixed spout, the former being primarily used in kitchen sinks, and the latter in bathroom lavatories.

As in the embodiments of FIGS. 1 to 4, the hot and cold water valves each have a threaded nipple 34 projecting downwardly from the manifold, through openings 40 in the sink ledge 16. Riser pipes 22 and 23 are connected to the nipples 34 by connector fittings 35, and openings 40 are large enough to pass fittings 35. A central hole 116 is provided in the sink ledge 16 directly beneath the midpoint of manifold 101, so that linkage (not shown) for operating the stopper in the wash-basin can pass down through the ledge to the stopper mechanism.

Holes in the sink ledge to pass the nipples and riser pipes (e.g., 40 in FIGS. 2 and 11; and 84 in FIGS. 7 and 10), or to receive the bushings (e.g., 53 in FIGS. 2 and 4; 73 in FIGS. 6 and 7) may be molded into the ledge when the sink is manufactured, or drilled at the time the faucet is installed, using a suitable bit for drilling through porcelain or whatever material the sink is made of.

The manifold 101 is secured to the sink ledge 16 by mounting bolts 50, which pass down through cylindrical barrels in the manifold (similar to barrels 51, 51' of FIGS. 2 and 4) and screw into bushings 52, which are the same as bushings 52 in FIGS. 2 and 4. A flat putty guard 120 is provided, which is sandwiched between the manifold 101 and the top surface of ledge 16, and thus provides a seal to prevent leakage of water through the holes in the sink ledge. Holes 121 are provided in the top of shell 102 directly above bolts 50, so that the latter can be reached with a wrench from above. When the bolts have been tightened down, holes 121 are closed by snap-in buttons 122.

The operation of the embodiments illustrated in FIGS. 5 to 11 is essentially the same as that described in connection with the embodiment of FIGS. 1 to 4, and it is therefore deemed unnecessary to repeat it for each of the illustrated forms. Suffice to say that in each of the illustrated embodiments, the faucet is quickly and easily installed or removed by working entirely from above the lavatory, except for the very minor and easy task of connecting the riser pipes to the shut-off valves. In the claims that follow, the term "bushing" refers to any of the three forms of bushing shown in the drawings, or equivalents thereof. The bushings are preferably installed in the sink at the time of manufacture, or at the time the sink is installed in the wall, at which time the of ledge 16 is readily accessible. In the case of the rubber bushing 92 shown in FIGS. 9 and 10, the bushing can be pressed into the hole 93 from above, and will remain in place by friction.

While I have shown and described in considerable detail what I consider the best illustrative embodiments of my invention, it will be understood by those skilled in the art that the invention is not limited to these specific embodiments, but might take various other forms within the scope of the following claims. I claim:

1. A quick-change faucet for mounting on the ledge of a sink, said faucet comprising, in combination:
   a faucet body having hot and cold water valves and a mixing manifold, each of said hot and cold water valves having a riser pipe with a connector fitting at its bottom end for connection with the respective shut-off valve, said riser pipes with attached connector fittings being passed down through apertures in the sink ledge;
   a pair of mounting bolts;
   means on said body comprising a first set of apertures through which said mounting bolts can be passed from above, with the heads of said mounting bolts being accessible to a wrench working from above; and
   a pair of internally threaded, annular, generally cylindrical bushings non-rotatably secured in a second set of apertures in said sink ledge to said sink ledge, said second set of apertures being located in matching relationship to said first set of apertures in said body in position to receive said mounting bolts from above, said mounting bolts being passed vertically downwardly through said first set of apertures and screwed vertically downwardly into said bushings from above said body and said means and drawn up tight to secure said faucet solidly to said sink ledge.

2. A quick-change faucet as in claim 1, wherein said faucet has a pair of laterally spaced, threaded pipe nipples extending downwardly from hot and cold water valves at opposite ends of said body; each of said pipe nipples having a riser pipe connected to its bottom end by a connector fitting, and each riser pipe having a connector fitting at its bottom end for connection to the respective shut-off valve; said nipples with attached riser pipes and connector fittings being passed downwardly from above through two laterally spaced apertures in the sink ledge.

3. A quick-change faucet as in claim 1, wherein said means comprises a pair of cylindrical barrels extending down through said mixing manifold between the ends thereof, said mounting bolts being passed downwardly through said barrels and the heads of the bolts being seated on annular shoulders in said barrels.

4. A quick-change faucet as in claim 1, wherein said mixing manifold has horizontal ears projecting laterally therefrom intermediate its ends, said ears having holes provided therein through which said mounting bolts are passed from above and screwed into said bushings.

5. A quick-change faucet as in claim 1, wherein said manifold has ears projecting horizontally from opposite ends thereof, said ears having holes provided therein through which said mounting bolts are passed from above and screwed into said bushings.

6. A quick-change faucet as in claim 1, wherein said faucet body has a base plate that lies flat against the top surface of the sink ledge; said base plate having apertures formed therein in axial alignment with the bushings in the sink ledge; and said bolts being passed downwardly through said apertures and screwed into said bushings.

7. A quick-change faucet as in claim 1, wherein said faucet body includes an internal water-mixing manifold and an external housing enclosing the same; said means comprising a pair of cylindrical barrels extending down through said manifold, through which said mounting bolts pass from above; said housing having apertures provided therein directly above each of said cylindrical barrels so that the heads of the mounting bolts can be reached from above by a tool; and snap-in buttons for closing said apertures.

8. A quick-change faucet as in claim 1, wherein each of said bushings comprises a cylindrical body having an internally threaded central aperture to receive said mounting bolt, and the outside of said body being threaded to receive a clamping nut on the bottom end of the bushing, said body extending through a hole in said sink ledge and having a radial flange on its top end that seats on the top surface of the ledge around the margin of the hole, and said clamping nut being screwed up on said external threads until it abuts against the underside of the sink ledge.

9. A quick-change faucet as in claim 1, wherein each of said bushings is expandable and comprises a cylindrical, centrally apertured rubber body that fits snugly within a hole in the sink ledge, and an internally threaded tubular ferrule molded into said body at the bottom end thereof, said mounting bolt being screwed into said ferrule and drawing the latter upwardly to bulge the sides of said body, thereby securing the bushing tightly to the sink ledge.

10. A quick-change faucet and sink, comprising, in combination:
   a sink having a horizontal ledge along the back side thereof;
   a faucet body having hot and cold water valves and a mixing manifold, each of said valves having a downwardly extending riser pipe with a connector fitting at the bottom end thereof for connection to the respective shut-off valve;
   said sink ledge having at least one aperture provided therein through which said riser pipes and connector fittings can be passed from above;
   means on said body comprising a first set of apertures through which a pair of mounting bolts can be passed from above, said mounting bolts being accessible to a wrench, working from above; and
   a pair of internally threaded, annular, generally cylindrical bushings non-rotatably secured in a second set of apertures in said sink ledge, said second set of apertures being located in matching relationship to said first set of apertures in said body in position to receive said mounting bolts from above, said mounting bolts being passed vertically downwardly through said first set of apertures and screwed vertically downwardly into said bushings from above said body and said means and drawn up tight therein to secure said faucet solidly to said sink ledge.

* * * * *

UNITED STATES PATENT OFFICE
CERTIFICATE OF CORRECTION

Patent No. 3,790,966     Dated Feb. 12, 1974

Inventor(s) Joseph Keane

It is certified that error appears in the above-identified patent and that said Letters Patent are hereby corrected as shown below:

Sheets 2 and 3 of the drawings, containing Figures 5-11, inclusive, as shown on the attached sheets should be added:

Signed and sealed this 4th day of March 1975.

(SEAL)
Attest:

RUTH C. MASON
Attesting Officer

C. MARSHALL DANN
Commissioner of Patents
and Trademarks

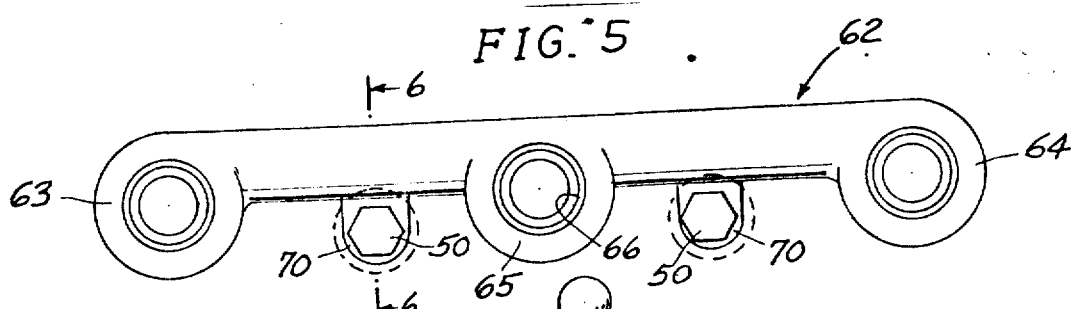
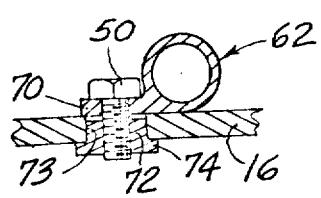
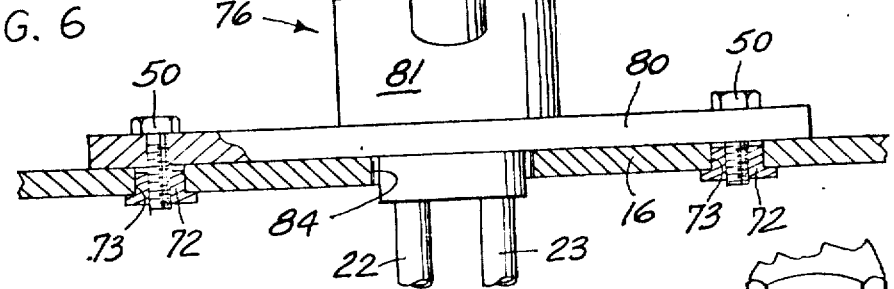
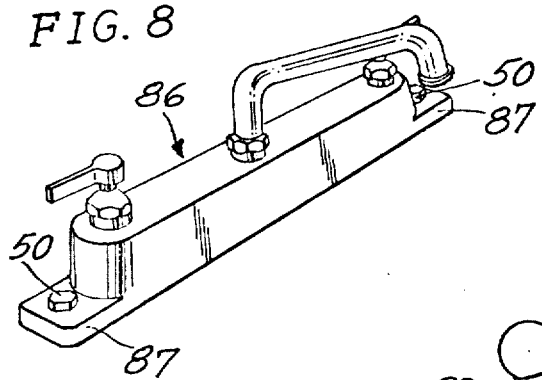
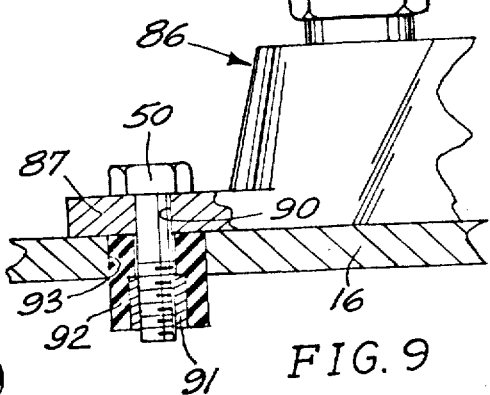
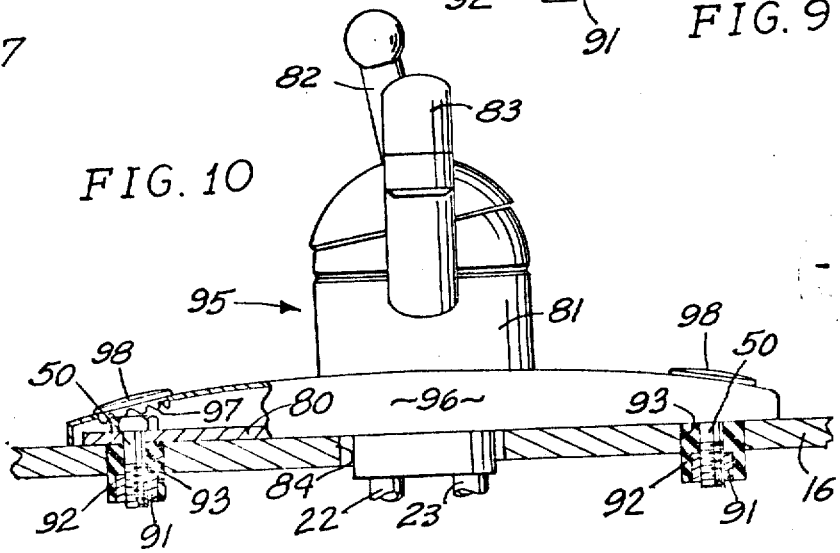

Patent No. 3,790,966